(12) United States Patent
Makos et al.

(10) Patent No.: US 9,194,153 B2
(45) Date of Patent: Nov. 24, 2015

(54) FRAME FOR PORTABLE SHELTER AND ASSEMBLY

(71) Applicant: Plano Molding Company, Plano, IL (US)

(72) Inventors: Timothy S. Makos, West Bend, WI (US); Ryan John Kleckner, Grafton, WI (US); Bruce Carl Nelson, Stillwater, MN (US)

(73) Assignee: Plano Molding Company, Plano, IL (US)

( * ) Notice: Subject to any disclaimer, the term of this patent is extended or adjusted under 35 U.S.C. 154(b) by 0 days.

(21) Appl. No.: 14/045,464

(22) Filed: Oct. 3, 2013

(65) Prior Publication Data

US 2014/0034100 A1 Feb. 6, 2014

Related U.S. Application Data

(60) Provisional application No. 61/744,795, filed on Oct. 4, 2012.

(51) Int. Cl.
| | |
|---|---|
| *E04H 15/38* | (2006.01) |
| *A01M 31/00* | (2006.01) |
| *E04H 15/00* | (2006.01) |
| *E04H 15/02* | (2006.01) |
| *E04H 15/48* | (2006.01) |
| *A01K 97/01* | (2006.01) |

(52) U.S. Cl.
CPC .............. *E04H 15/38* (2013.01); *A01K 97/01* (2013.01); *A01M 31/00* (2013.01); *E04H 15/001* (2013.01); *E04H 15/02* (2013.01); *E04H 15/48* (2013.01); *Y10T 29/49826* (2015.01)

(58) Field of Classification Search
USPC ......... 135/117, 124, 132, 133, 139, 140, 143, 135/148, 153
See application file for complete search history.

(56) References Cited

U.S. PATENT DOCUMENTS

| | | | |
|---|---|---|---|
| 2,937,651 A | 5/1960 | Tassel | |
| 3,012,567 A | 12/1961 | Walton | |
| 3,586,013 A | 6/1971 | Gladden | |
| 3,703,311 A | 11/1972 | Davis et al. | |
| 4,088,363 A | 5/1978 | Palmer | |
| 4,585,020 A * | 4/1986 | Masuda et al. | 135/95 |
| 4,612,948 A | 9/1986 | Simpson | |
| 5,271,423 A | 12/1993 | Eychaner | |
| 5,368,057 A * | 11/1994 | Lubkeman et al. | 135/133 |
| 8,191,564 B1 | 6/2012 | Lindholm | |
| 2006/0081281 A1 | 4/2006 | Makos et al. | |
| 2006/0238005 A1 | 10/2006 | Walter et al. | |
| 2009/0320893 A1 | 12/2009 | Engstrom et al. | |

OTHER PUBLICATIONS

International Search Report issued on related PCT Application No. PCT/US2013/063270 on Jan. 13, 2014.

* cited by examiner

Primary Examiner — Noah Chandler Hawk
(74) Attorney, Agent, or Firm — McGuireWoods LLP

(57) ABSTRACT

A portable shelter including a base, a collapsible support member that is projectable substantially diagonally upward and rearward from the portion of the base, a collapsible base support member that is projectable first diagonally downward to a bend and then forward from the portion of the base, and another collapsible support member or a spreader bar that is attachable to an end portion of the collapsible base support member, wherein the collapsible support member, the another collapsible support member or the spreader bar, and the collapsible base support member include a frame.

8 Claims, 7 Drawing Sheets

FRAME FOR PORTABLE SHELTER AND ASSEMBLY

CROSS REFERENCE TO PRIOR APPLICATIONS

This application claims priority to and the benefit thereof from U.S. provisional patent application no. 61/744,795, filed Oct. 4, 2012, titled "Frame for Portable Shelter and Assembly," the entirety of which is hereby incorporated herein by reference.

FIELD OF THE DISCLOSURE

The present disclosure relates generally to a portable shelter and more specifically it relates to a collapsible portable fish house with a side door.

BACKGROUND OF THE DISCLOSURE

Currently, a collapsible portable fish house is known that has a frame and a canvas cover with a single opening for egress, located at the front of the fish house. This arrangement is inconvenient, especially when more than one fishermen share a fish house. In order to enter into and exit from the fish house, a fisherman has to reach the front door and unzip the door or flip the tent flap. This is difficult to perform without stepping over his fellow fishermen, the fish holes cut into the ice, or the fishing gear. Because of this problem, there is a need for a new and improved fish house that will allow multiple fishermen to enter and exit the fish house with ease and convenience.

SUMMARY OF THE DISCLOSURE

Accordingly, one aspect of the present disclosure provides a portable shelter which includes a base, a support bracket that is attachable to the base, a first collapsible support member that is projectable substantially vertically upward from the support bracket, a second collapsible support member that is projectable substantially diagonally upward and rearward from the support bracket, a collapsible base support member that is projectable first diagonally downward to a bend and then forward from the support bracket, a third collapsible support member that is attachable to an end portion of the collapsible base support member, a first spreader bar that is configured to extend upward from the base to an end of the second collapsible support member, the end being distal to the support bracket, a second spreader bar that is configured to extend upward and forward from the end of the second collapsible support member to an end of the first collapsible support member that is distal to the support bracket, and a third spreader bar that is configured to extend downward and forward from the end of the first collapsible support member to an end of the third collapsible support member that is distal to the collapsible base support member, wherein the first collapsible support member, the second collapsible support member, the third collapsible support member, the base collapsible support member, the first spreader bar, the second spreader bar, and the third spreader bar include a frame. The first, second, or third spreader bar may include a collapsible spreader bar.

The portable shelter may include a cover mounted on and over the frame. The cover may include a door formed into at least one side of the cover. The side door is capable of being opened and closed to allow entrance into and egress from the portable shelter.

At least one of the collapsible support members and the spreader bars may include a fastener. The fastener may include a push button, a pin, a lock, a clip, a clamp, a bolt, or a screw.

The portable shelter may further include a wind flap that is positionable over a bottom end of a door.

The portable shelter may include a window.

According another aspect of the present disclosure, a portable shelter is provided that includes a base, a collapsible support member that is projectable substantially diagonally upward and rearward from the portion of the base, a collapsible base support member that is projectable first diagonally downward to a bend and then forward from the portion of the base, and another collapsible support member or a spreader bar that is attachable to an end portion of the collapsible base support member, wherein the collapsible support member, third collapsible support member or the spreader bar, and collapsible base support member comprise a frame.

The portable shelter includes a cover mounted on and over the frame.

The portable shelter includes a side door formed in a sidewall of the cover, the side door being capable of being opened and closed to allow entrance into and egress from the portable shelter.

The portable shelter may include a spreader bar that is configured to extend upward from the base to an end of the collapsible support member, the end being distal to the portion of the base. The portable shelter may include a spreader bar that is configured to extend from the end of the collapsible support member.

The portable shelter may include a spreader bar that is configured to extend from the another collapsible support member.

The portable shelter may include a wind flap that is positionable over a bottom portion of the side door.

According to a further aspect of the present disclosure, a method is provided for manufacturing a portable shelter. The method includes providing a base, attaching a collapsible support member to the base, the collapsible support member being configured to project substantially diagonally upward and rearward from the base when the portable shelter is erected, attaching a collapsible base support member to the base, the collapsible base support member being configured to project first diagonally downward to a bend and then forward from the base, and attaching another collapsible support member or spreader bar to an end portion of the collapsible base support member, wherein the collapsible support member, said another collapsible support member or spreader bar, and the collapsible base support member comprise a frame.

The method may include providing a spreader bar that may be positioned between end portions of a pair of collapsible support members.

The method may include placing a cover on and over the frame. The cover includes a side door formed in a side wall of the cover allow entrance into and egress from the portable shelter.

The method may further include attaching a further collapsible support member that is projectable substantially vertically upward from the base.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Some embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, these embodiments are provided for the thorough and complete understanding of the present disclosure, and completely conveying the scope of the present disclosure to those skilled in the art.

The terms "including," "comprising" and variations thereof, as used in this disclosure, mean "including, but not limited to," unless expressly specified otherwise.

The terms "a," "an," and "the," as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1:
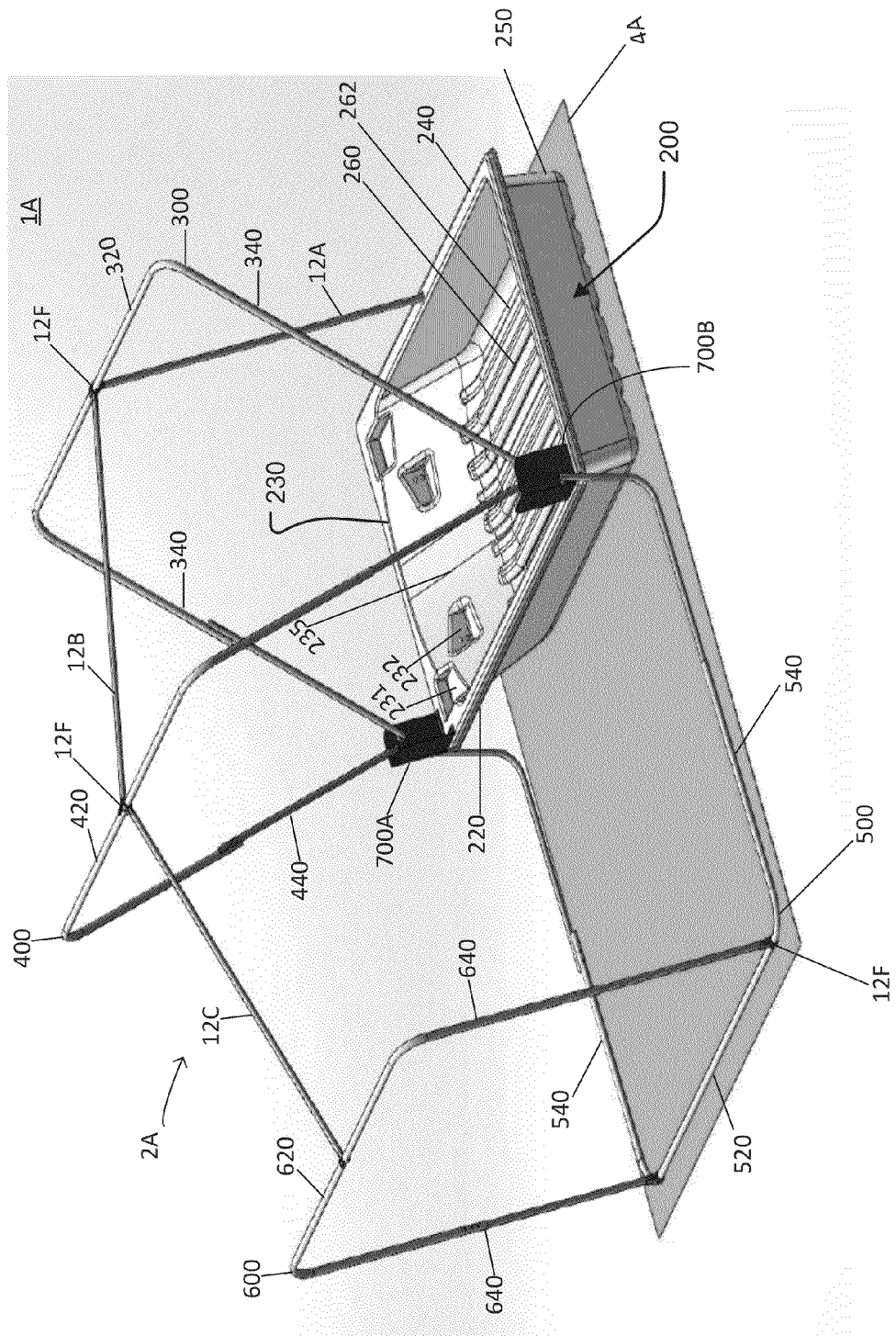
FIG. 1 shows a perspective view of an example of a portable shelter without any covering, constructed according to the principles of the disclosure.

FIG. 1 shows a perspective view of an example of a portable shelter 1A without a cover, which is constructed according to the principles of the disclosure. The portable shelter 1A may be used as a portable fishing house, a camping shelter, a portable storage, or the like. The portable shelter 1A includes a base 200, a frame 2A, a pair of brackets 700 (700A and 700B), and a cover 3A (not shown in FIG. 1). The portable shelter 1A may further include a floor 4A. The floor 4A may include e.g., a tarp, an insulating material, a weatherproof material, and so on.

The base 200 has a front portion 220, a first side portion 230, a second side portion 250, a back portion 240, and a floor portion 260. The base 200 may be made of a material, such as, for example, plastic, metal, carbon-fiber, fiberglass, glass, cloth, foam, wood, or the like, or any combination thereof.

The side portion 230 may include a plurality of openings 231, 232. The side portion 230 may further include a slanted wall portion 235. The openings 231, 232 may be configured so that a user may move the portable shelter 1A by, for example, gripping a part of the side portion 230 by means of one or more of the openings 231, 232 and moving the base 200 to a desired location. Alternatively, the openings 231, 232 may be used to secure, e.g., a pull-cord that may be attached to a vehicle (e.g., an all-terrain-vehicle (ATV), a boat, or the like) to pull the base 200. The openings 231, 232 may be additionally (or alternatively) used to hold objects (e.g., a fishing pole) or to allow objects to pass there-through (e.g., a hose) to connect equipment (e.g., a propane heater) inside the base 200 to equipment (e.g., a propane tank) located outside of the base 200, or simply outside of the base 200 (e.g., a heater exhaust output). The slanted wall portion 235 may assist in reducing drag, such as, e.g., when the base 200 is dragged by a user on snow, on water, or the like.

The side portion 250 may include openings (not shown) similar to openings 231 and/or 232. The side portion 250 may also include a slanted wall portion (not shown) similar to slanted wall portion 235.

The front portion 220 and the back portion 240 each include a side wall that may include one or more openings, such as, e.g., openings similar to openings 231 and/or 232. The side walls may be substantially perpendicular to the floor portion 260, or offset by a predetermined angle with respect to the floor portion 260, where the angle formed by the planar surface of the side wall with respect to the planar surface of the floor portion 260 may be in the range of, e.g., about 90° to about 135°. Alternatively, the angle may be less 90° than or greater than 135°, one of ordinary skill in the art will readily recognize.

The floor portion 260 tnay include one or more ribs 262, which may function to increase strength and rigidity of the floor portion 260 and base 200. The rib(s) 262 may also function to provide directional control of the base 200 such as, for example, when the base 200 is dragged by a user on snow or water.

The frame 2A includes a plurality of support members 300, 400, 500, 600, and a plurality of stretcher bars 12A, 12B, and 12C. The support members 300, 400, 500, 600, may include a portion that is U-shaped. The support member 500 may include a bent portion and a U-shaped portion. The support members 300, 400, 500, 600, may be telescopically adjustable so as to allow for adjustment in height of the frame 2A. The stretch bars 12A, 12B, 12C, may each include a rod. The stretch (or spreader) bars 12A, 12B, 12C may each include a support member fastener 12F, which may be attached to or integrally formed with an end of the stretch bar. One or more of the stretch bars 12A, 12B, 12C may include a collapsible structure, such as, e.g., a two or more rod-members telescopically joined together. The fastener 12F may include a U-shaped member, a C-shaped member, a bracket, a clamp, or the like, which may be configured to have a diameter slightly greater than the diameter of the support members 300, 400, 600. The fastener 12F may be pivotally or rotatably mounted and secured to a portion of the support member 300 (or 400 or 600), allowing the spreader bar 12 to pivot or rotate about the point at which the fastener 12F is attached to the support member.

The brackets 700 may include a pair of opposing brackets 700A, 700B. The brackets 700A, 700B may include e.g., an L-shaped bracket, a U-shaped bracket, a C-shaped bracket, a plate, or the like. The brackets 700 may be integrally formed with or in the base 200. The brackets 700 may be made of the same material as or a different material than the base 200. The brackets 700 may form the structure to which a portion of the frame 2A may be attached, including the support members 300, 400, 500. The brackets 700 may be affixed to the base 200 by means of fasteners, or the brackets 700 may be integrally formed with the base 200. The brackets 700 may be affixed to or formed integrally atop of or (partially or entirely) within the base 200. The fasteners (not shown) may include, for example, push-buttons, adhesives, pins, bolts, screws, nuts, clips, clamps, rivets, hook-and-loops, tongue-and-groove, or the like. The support members 300, 400, 500 may be anchored to, and rotatable about the brackets 700.

The support members 300, 400 may be attached to an inner portion of each of the brackets 700 and the support member 500 may be attached to an outer (or an inner) portion of each of the brackets 700. Alternatively, the support member 500 may be attached to an inner (or outer) portion of each of the brackets 700 and the support members 300, 400 may be attached to an outer portion of each of the brackets 700.

Each of the support members 300, 400, and 500 may include a horizontal portion 320, 420, 520, respectively, and a pair of telescoping and opposing side portions 340, 440, 540, respectively. The horizontal portion 520 may provide an anchor point for the pivotable U-shaped support member 600. The support member 600 may include a horizontal portion 620 and a pair of telescoping and opposing side portions 640. The side portions 640 may be rotatably attached to the horizontal portion 520 of the support member 500 by a pair of respective fasteners 12F.

The stretcher bars 12A, 12B, and 12C may be disposed between the horizontal portions 320, 420 of the support members 300, 400, and the horizontal portion 620 of the support member 600, as shown in FIG. 1. Each of the stretcher bars 12A, 12B, and 12C includes a straight portion having opposing ends, each opposing end including a fastener 12F that can be removably positioned on the back portion 240 of the base 200 or on the horizontal portions 320, 420, 620 of the support members 300, 400, 600, respectively, as mentioned above. The stretcher bar 12A may include a rod-like end portion instead of the fastener 12F, which may be inserted through a hole provided in the back portion 240 of the base 200.

The stretcher bars 12A, 12B, and 12C may be compressible and rotatably attached to the collapsible support members 300, 400, and 600. For example, the stretcher bar 12A may be pivotally attached at one end (e.g., by means of the fastener 12F) to either the back portion 240 of the base 200 or to the horizontal portion 320 of the support bar 300; and the other end of the stretcher (or spreader) bar 12A may be removably attachable to either the horizontal portion 320 or back portion 240, respectively, so as to allow the spreader bar 12A to be readily detached from the base 240 (or horizontal portion 320), pivoted so that it rests in the same plane as the support bar 300 (or rests in the base 200), and collapsible to allow the bar 12A to fit within the width of the base 200. The stretcher bar 12B may be pivotally fixed at one end to either the horizontal portion 320 of the support bar 300 or to the horizontal portion 420 of the support bar 400, and the other end may be configured to be readily removal so as to allow the bar 12B to be pivoted into the same plane as the bar 300 (or 400). The stretcher bar 12C may be pivotally fixed at one end to either the horizontal portion 420 of the support bar 400 or to the horizontal portion 620 of the support bar 600, and the other end may be configured to be readily removal so as to allow the bard 12C to be pivoted into the same plane as the bar 400 (or 600). The foregoing configuration may ensure that the spreader arms 12A, 12B, 12C don't get separated from the frame 12A and, possibly, lost, while providing for easy collapsibility (or expandability) of the frame to or into the base 200.

Figure 2:
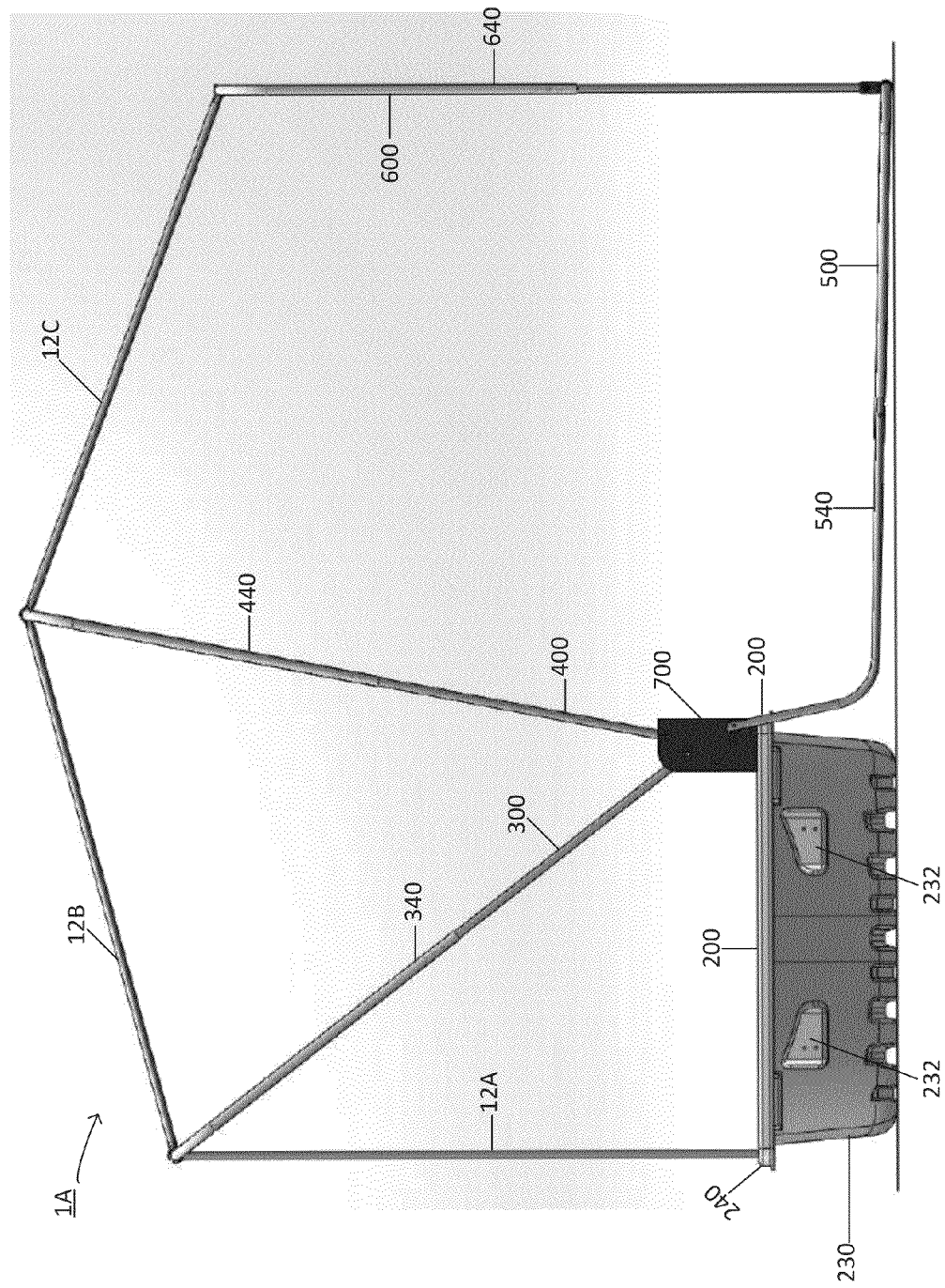
FIG. 2 shows a side view of the portable shelter illustrated in FIG. 1.
Figure 3:
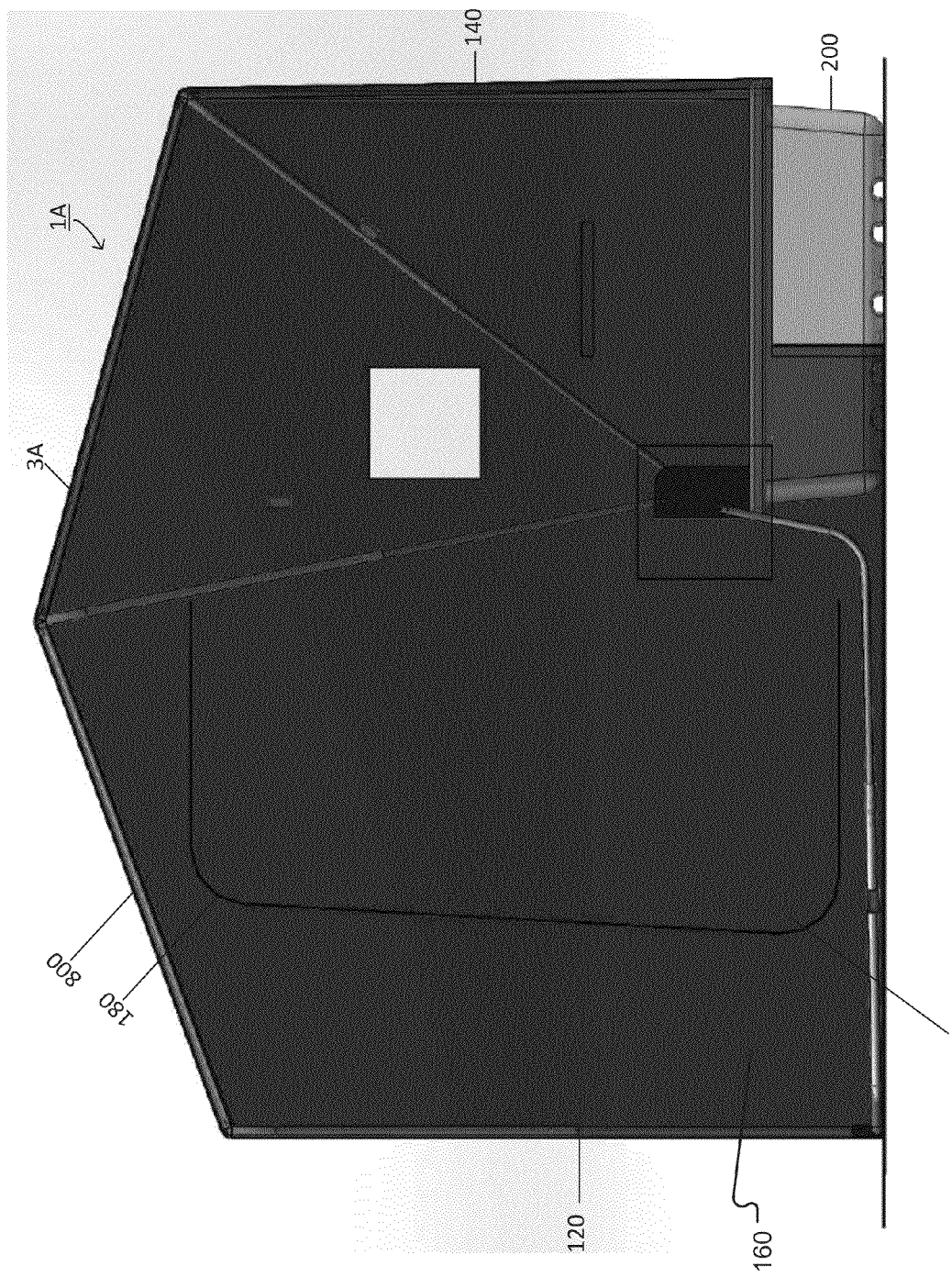
FIG. 3 shows a side view of the portable shelter illustrated in FIG. 1, including a cover.

When fully and properly assembled, the frame 2A may be configured to form a structure that has near vertical front and rear walls 120, 140 (shown in FIG. 3). This configuration may be used to maximize the use of space within the portable shelter 1A (as shown, e.g., in FIG. 2).

Referring to FIG. 3, a cover 800 may be placed over the frame 2A to enclose the space therein. The cover 800 may include one or more access openings 180 that may be placed in, e.g., a pair of opposing side walls 160 for easy access to the interior of the shelter 1A. The cover may further include one or more doors 810 that are configured to substantially seal the one more access openings 180. The door(s) 810 may be configured to open in any direction, including, from left to right, from right to left, from top to bottom, from bottom to top, diagonally, or the like. The door(s) 810 may be configured to be partially or entirely removable. The seal may be formed by a fastening mechanism such as, e.g., zippers, hook-and-loop fasteners, or the like. The cover 800 may be made of a material such as, e.g., cloth, fabrics, canvas, foam, insulating material, fiberglass, metal, carbon fiber, or the like, or any other suitable weatherproof material.

In application, the base 200 is used to anchor the support members 300, 400, 500, 600 by means of, e.g., the brackets 700. When stowed, the support members 300, 400, 500, 600 are collapsed and lay on top of or in the base 200. When assembly is required, the primary support members 300, 400, 500 are rotated to the positions shown in FIGS. 1 and 2 and their respective telescoping side portions 340, 440, 540 are extended. The secondary support member 600 is then rotated upwardly and the stretcher bars 12A, 12B, 12C are put into place. In alternative configuration, the stretcher bars 12A, 12B, 12C, may already be attached at one end to the support members 300, 400, 500, in which case the bards 12A, 12B, 12C may be pivoted and aligned into position (e.g., the configuration shown in FIG. 1). The cover 800 may then be mounted over the assembled frame 2A to form the structure (as shown in FIG. 3).

Figure 4:
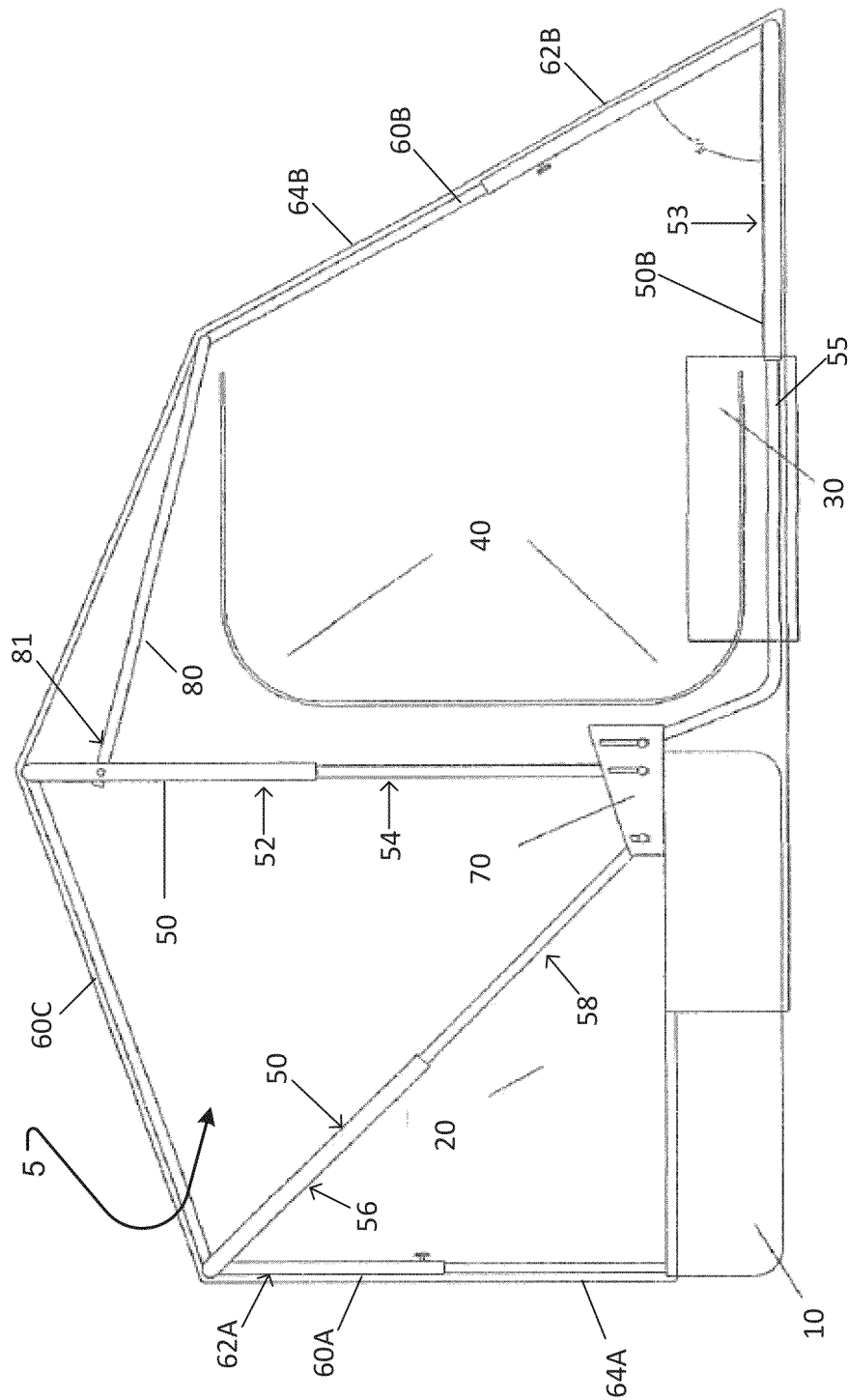
FIG. 4 a side view of another example of portable shelter with a side-wall portion of the cover removed.

FIG. 4 shows a side view of another example of a portable shelter 1 that is constructed according to the principles of the disclosure. The portable shelter 1 includes a base 10, a frame 5, a cover 20, a wind flap 30, a side door 40, and a support bracket 70, a non-removable hinged support member 80. Base 10 may be made of the same material as base 200. The cover 20 may be made of the same material as cover 800.

A side door 40 is formed into the cover 20. Side door 40 may opened and closed by means of fastening mechanism, such as, e.g., a zipper, a hook-and-loop fastener, or the like. The cover may, alternatively, include a mechanical door that may be opened by hand or by an actuator under control of an electrical signal, and the like. According to aspects of the disclosure, the side door 40 may be provided on only one side of the shelter, or on both sides of the shelter. If there is a second side door on the opposite side of the shelter, the second door 40 may be constructed to be a mirror image of the first side door 40 (as shown, e.g., in FIG. 4).

A wind flap 30 may be provided and positioned over a bottom portion of the side door 40. The wind flap 30 may function to keep out light, wind, cold, snow, water, and the like, without the need to close the side door 40 all the way down to the ground surface. The wind flap 30 may be made out of same material as the cover 20 (or cover 800).

Figure 5:
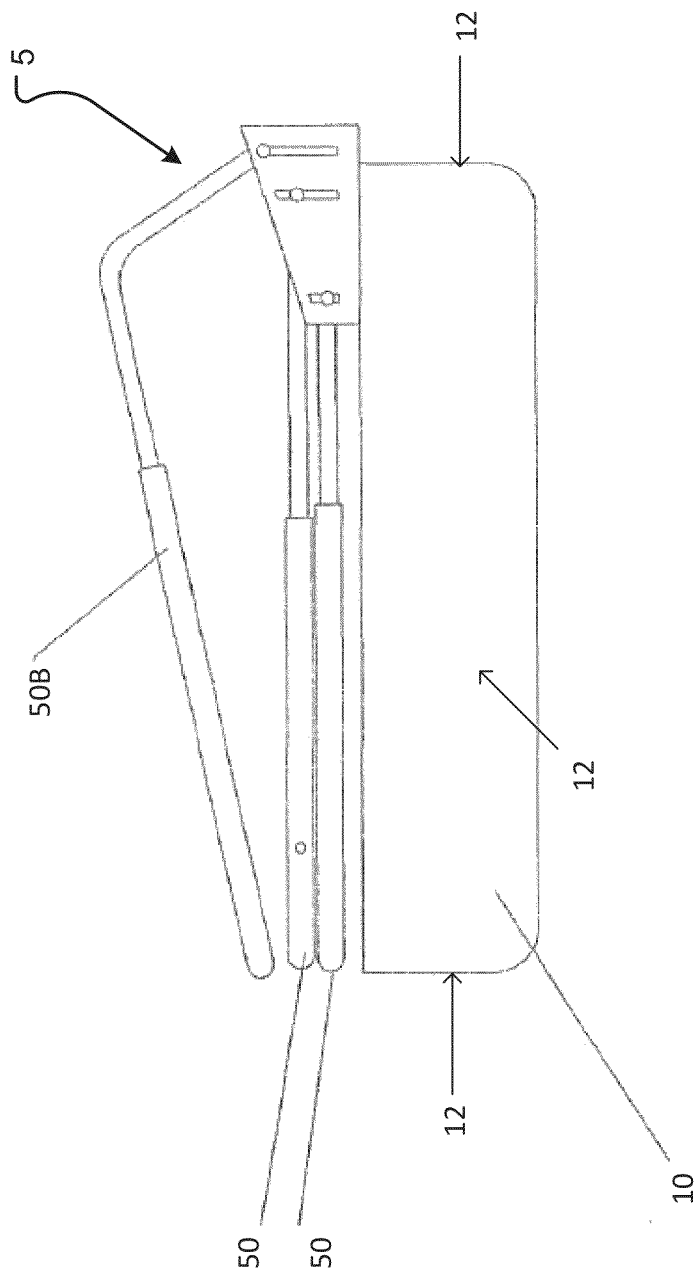
FIG. 5 shows a side view of the portable shelter of FIG. 4 in a substantially collapsed position without the cover.

The base 10 includes a plurality of side walls 12 and a floor as shown in FIG. 5. The side walls 12 may include a pair of first side walls, and a pair of longitudinal side wails. The base 10 may be configured to hold a portion of, or the entire frame 5 when it is folded into a collapsed configuration (as shown, in FIG. 5).

FIG. 4 shows an example of a side view of the frame 5 that is constructed according to the principles of the disclosure. The cover 20 is installed over and supported by a frame 5 (as shown, e.g., in FIG. 4). The frame 5 includes non-removable collapsible support members 50 that may be rotated to a diagonal position and a vertical position, non-removable collapsible base support member 50B, removable collapsible spreader bars 60A and 60B, removable collapsible spreader bar 60C, and a non-removable hinged support member 80.

Figure 7:
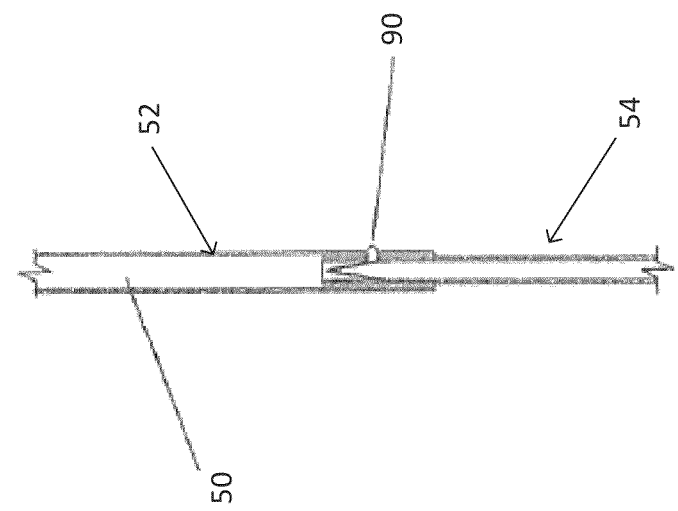
FIG. 7 shows a detailed view a collapsible support arm with an example of a fastener.

The support bracket 70, which may be mounted on or (partially or entirely) within the base 10, functions to pivotally anchor the support members 50 and the base support member 50B. One of the support members 50 (the first support member), when the frame 5 is in the erected position, extends substantially vertically upward from support bracket 70, and the other support member 50 (the second support member), when the frame 5 is in the erected position, extends substantially diagonally upward and rearward from the bracket 70. The base support member 50B, when the frame 5 is in the erected position, extends first diagonally downward and then bends to continue forward from the support bracket 70. The bend in the base support member 50B allows for door clearance so that persons entering or leaving the shelter 1 do not have to step over the member 50B to enter or exit the shelter 1. The support members 50 and base support member 50B are each collapsible and adjustable as to length by means of a fastener 90 (as shown e.g., in FIG. 7). The fastener 90 may include, for example a spring button clip, a spring pin, a pin, a clip, a clamp, a screw, a bolt, a nut, or the like.

The vertical support member 50 may include a plurality of sub-members, including a first submember 52 and a second submember 54. The submembers 52 and 54 may be telescopically joined, with the submember 52 being configured to slidably hold submember 54. The submembers 52 and 54 may be locked into an extended configuration as shown in FIG. 4, by means of a fastener 90 (as shown, e.g., in FIG. 7).

Additionally, the diagonal support member 50 may include a plurality of submembers, including a first submember 56 and a second submember 58 (as shown in FIG. 4). The submembers 56 and 58 may be telescopically joined, with the submember 56 being configured to slidably hold submember 58. The submembers 56 and 58 may be locked into an extended configuration by the fastener 90, as shown in FIG. 4.

The base support member 50B may include plurality of submembers, including a first submember 53 and a second submember 55 (as shown in FIG. 4). The submembers 53 and 55 may be telescopically joined, with the submember 53 being configured to slidably hold submember 55. The submembers 53 and 55 may be locked into an extended configuration as shown in FIG. 4, by means of the fastener 90.

The non-removable hinged support member 80 may be connected by a hinge mechanism 81 to the vertical support member 50 (e.g., slightly below the top end of support member 50). The hinged support member 80 may be configured to extend diagonally downward and forward from the support bracket 70 (and support member 50) (as shown e.g., in FIG. 4). The hinge mechanism 81 may include, e.g., a pivot hinge, a pin, a rivet, a bolt-nut, a screw, or the like. Hinged support member 80 is configured to swing upward when the shelter 1 is erected and downward when the shelter 1 is collapsed. The hinged support member 80 supports the cover 20 and eliminates the need for an additional support members extending diagonally upward and forward from the support bracket.

Figure 8:
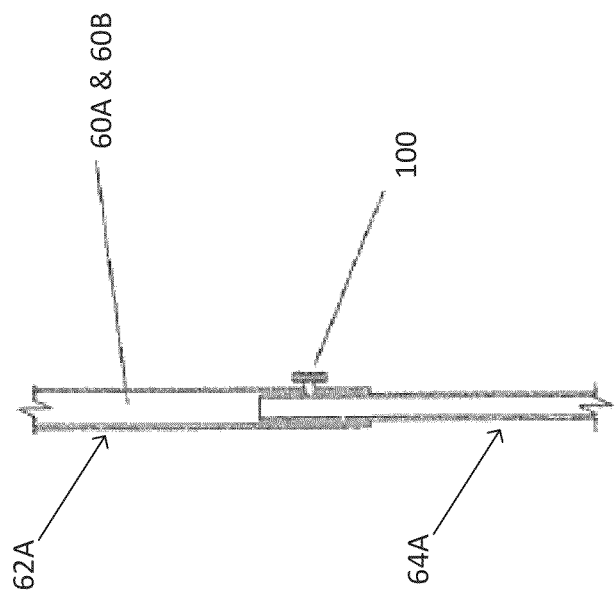
FIG. 8 shows a detail view of a collapsible spreader bar with another example of a fastener.

The frame 5 of the shelter may be completed by adding the removable spreader bars 60A, 60B, and 60C (as shown in FIG. 4). Spreader bars 60A and 60B are each collapsible and adjustable as to length by means of a fastener 100 as shown in FIG. 8. The fastener 100 may be the same as fastener 90. Spreader bar 60C, which is non collapsible and therefore has a fixed length, extends diagonally downward and rearward from the top of vertical support member 50 to the junction of diagonal support member 50 and spreader bar 60A. The spreader bars 60A, 60B, and 60C impart tension between the support members with which they interface, in order to keep the portable shelter in erected position and to prevent the cover 20 from sagging.

Spreader bar 60A extends vertically upward from base 10 to the end of diagonal support member 50 that is distal to support bracket 70. Spreader bar 60B extends diagonally upward and to the rear from the front end of base support member 50B to the front end of hinged support member 80, forming an acute angle with the base support member SOB and forming an obtuse angle with hinged support member 80. Spreader bar 60B supports hinged support member 80 (as shown e.g., in FIG. 4).

The removable spreader bar 60A may include a plurality of submembers, including a first submember 62A and a second submember 64A (as shown in FIG. 4). The submembers 62A and 64A may be telescopically joined, with the submember 62A being configured to slidably hold submember 64A. The submembers 62A and 64A may be locked into an extend configuration as shown in FIG. 4, by means of the fastener 90 (or 100).

Additionally, the removable spreader bar 609 may include a plurality of submembers, including a first submember 6213 and a second submember 64B (as shown in FIG. 4). The submembers 62B and 64B may be telescopically joined, with the submember 62B being configured to slidably hold submember 64B. The submembers 62B and 649 may be locked into an extended configuration as shown in FIG. 4, by means of the fastener 90 (or 100).

Figure 6:
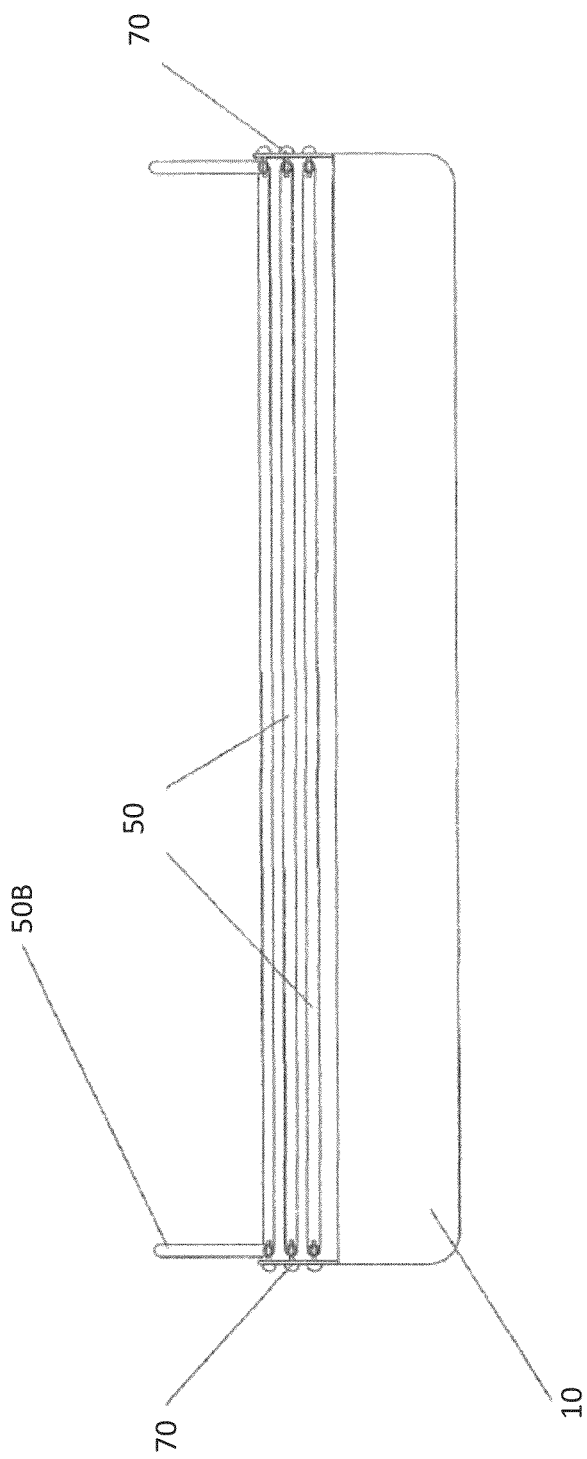
FIG. 6 shows a front view of the portable shelter of FIG. 4 in a substantially collapsed position without the cover.

In order to transport and store the portable shelter, spreader bars 60A, 60B, and 60C are removed, and support members 50 and base support member 50B are folded down into the collapsed position shown in FIGS. 5 and 6.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A portable shelter, comprising:
   a base;
   a support bracket that is attachable to the base;
   a first collapsible support member that is projectable substantially vertically upward from the support bracket;
   a second collapsible support member that is projectable substantially diagonally upward and rearward from the support bracket;

a collapsible base support member that is projectable first diagonally downward to a bend and then forward from the support bracket;

a third collapsible support member that is attachable to an end portion of the collapsible base support member;

a first spreader bar that is configured to extend upward from the base to an end of the second collapsible support member, said end being distal to the support bracket;

a second spreader bar that is configured to extend upward and forward from said end of the second collapsible support member to an end of the first collapsible support member that is distal to the support bracket; and a third spreader bar that is configured to extend downward and forward from said end of the first collapsible support member to an end of the third collapsible support member that is distal to the collapsible base support member, wherein the first collapsible support member, the second collapsible support member, the third collapsible support member, the base collapsible support member, the first spreader bar, the second spreader bar, and the third spreader bar comprise a frame, and wherein an opening is defined in the frame, the opening being an unobstructed area bounded by the third spreader bar, the first collapsible support member, the collapsible base support member, and the third collapsible support member.

2. The portable shelter of claim 1, further comprising:
a cover mounted on and over said frame.

3. The portable shelter of claim 2, wherein the cover comprises:
a side door formed into at least one side of said cover, the side door being capable of being opened and closed to allow entrance into and egress from said portable shelter.

4. The portable shelter of claim 1, wherein at least one of the collapsible support members and the spreader bars comprise a fastener.

5. The portable shelter of claim 1, wherein the fastener comprises:
a push button;
a pin;
a lock;
a clip;
a clamp;
a bolt; or
a screw.

6. The portable shelter of claim 1, further comprising:
a wind flap that is positionable over a bottom end of a door.

7. The portable shelter of claim 1, further comprising a window.

8. The portable shelter of claim 1, wherein the first, second, or third spreader bar comprises a collapsible spreader bar.

* * * * *